May 19, 1925.
J. D. BLAGDEN
FISHING REEL
Filed Aug. 21, 1924
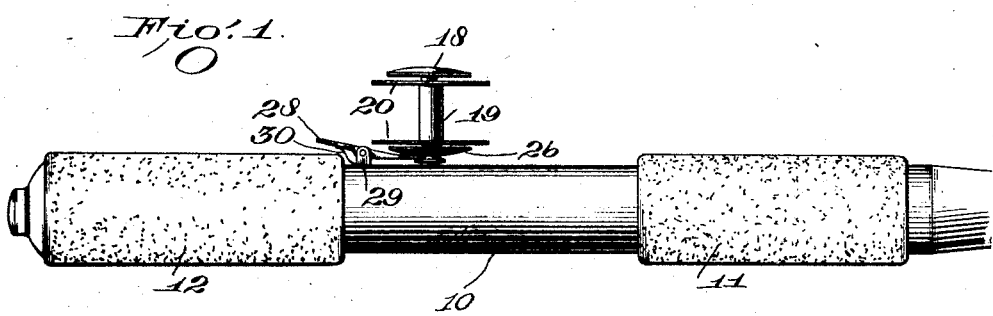
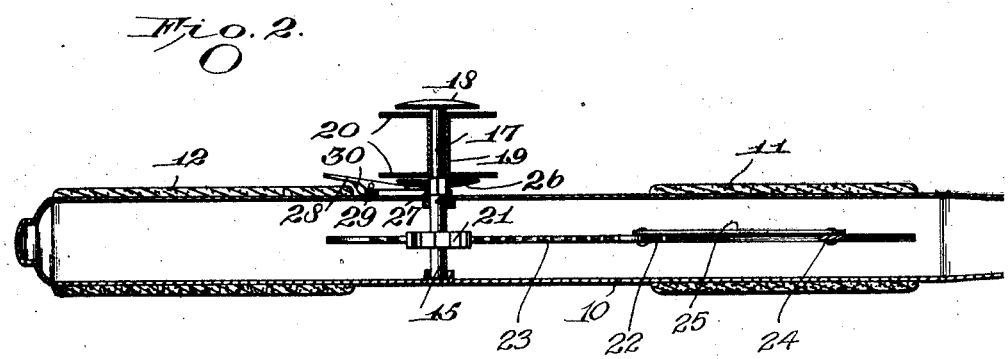
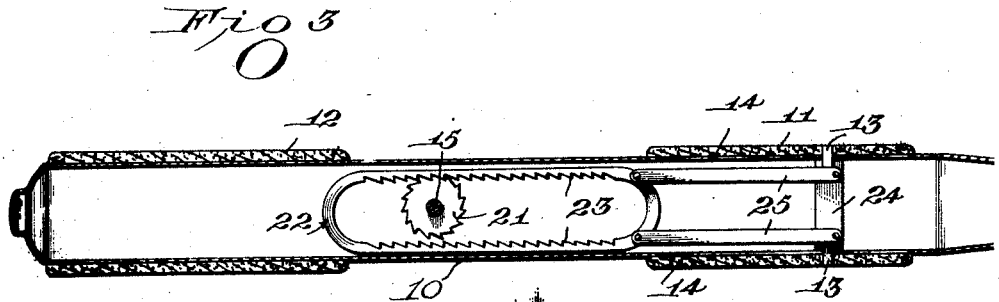
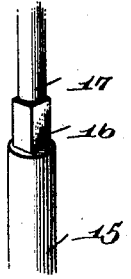
WITNESSES
INVENTOR
John D. Blagden
BY
ATTORNEYS Patented May 19, 1925.

1,538,377

UNITED STATES PATENT OFFICE.

JOHN D. BLAGDEN, OF MEMPHIS, TENNESSEE.

FISHING REEL.

Application filed August 21, 1924. Serial No. 733,427.

*To all whom it may concern:*

Be it known that I, JOHN D. BLAGDEN, a citizen of the United States, and a resident of Memphis, in the county of Shelby and State of Tennessee, have invented certain new and useful Improvements in Fishing Reels, of which the following is a specification.

This invention relates to improvements in fishing reels.

The invention has for its object to provide a simple and easily operated reel winding means for fishing rods.

In carrying out the invention there is preferably employed a construction of fishing rod having a member movable longitudinally of the rod and suitable means associated with and connected to said movable member whereby a reel may be rotated with movement of member in either direction. The device permits a fishing line to be wound upon a reel in an exceedingly quick manner and a minimum of exertion on the part of the operator.

The invention is illustrated by way of example in the accompanying drawings, in which:

Figure 1 is a perspective view of the handle portion of a fishing rod with the present invention applied, Figure 2 is a longitudinal sectional view of the same, Figure 3 is a view similar to Figure 2 but taken at right angles thereto, and Figure 4 is a fragmentary detail view of the reel operating shaft.

Referring to the drawings more particularly, 10 indicates a tubular stock which may be referred to as the handle portion or section of a fishing rod. Upon the member 10 there is arranged the two grip members 11 and 12, the grip 12 being preferably fixed while the grip 11 is movable upon the tube or handle section 10.

The grip 11 as is seen in the drawings is preferably located forward to grip 12. The grip 11 carries a pair of pins 13 which are slidable in a slot 14 formed in tube 10. The pins should be so located upon the grip 11 and the slots 14 should be of such length that irrespective of the position of the grip 11 the same entirely covers the slots 14.

Transversely of the tubular handle section 10 there is journalled a shaft 15. This shaft may be journalled in any convenient manner. The one end of the shaft is extended and this extended part of the shaft comprises a squared portion 16 and a slightly reduced spindle or shaft portion 17 which carries at its free end a friction disk 18.

The reduced spindle or shaft portion has turnably mounted thereon a reel, said reel preferably comprising a hub 19 having each end formed with a suitable retaining flange 20.

The shaft 15 has fixed thereon a ratchet gear 21, and within the handle section 10 there is arranged an elongated frame 22 which may be made of a bar as shown and which has each inner longitudinal edge formed with ratchet teeth 23, the teeth upon one edge extending in a direction opposite to the teeth upon the other edge as shown. This frame member may be referred to as a double ratchet bar and as is apparent can be brought to rotate the ratchet gear 21 with longitudinal movement of the bar in either direction.

The pins 13 are secured to the ends of a cross-head 24 and this cross-head is connected to the member 22 by the link members 25. The link members 25 should be pivotally connected to the member 22 as best shown in Figure 3. As is entirely apparent, movement of the grip member 11 in either direction will rotate the shaft 15 in one direction.

Upon the squared portion 16 of the shaft 15 there is slidable a second friction disk 26. It should be noted that a shoulder occurs between the reduced shaft or spindle portion 17 and squared portion 16, thereby forming a stop against movement of the reel upon the spindle or shaft portion 17 in one direction. The friction disk 18 limits movement of the reel in the opposite direction.

The friction disk 26 is provided with an extended hub 27 in which there is formed an annular groove adapted to receive the forked end of a lever 28 as plainly shown in Figure 2. The lever 28 is fulcrumed upon the handle section 10 as at 29 and preferably a spring 30 is provided for the lever which will normally hold the disk 26 from engagement with the associated reel flange 20. The free end of the lever 28 may be formed so that the same can be conveniently depressed by the thumb of an operator.

In the use of this device, the fishing rod should be held to bring the reel uppermost as illustrated in the drawings. When it is desired to rotate the reel for winding a fishing line thereon, the grip member 11 is reciprocated by one hand of the operator and the thumb of his other hand should be used to depress the lever 28 for bringing friction disk into engagement with the reel and elevate the same to be pressed against the friction disk 18. The reel will now be connected to rotate with the shaft 15. Upon releasing the lever 28 the reel will drop away from disk 18 and the rotation thereof discontinue.

While I have shown and described the preferred form of my invention I wish it understood that I am aware of the fact that changes might be made in the general combination and arrangement of parts without departing from the spirit of my invention.

I claim:

1. A fishing rod having a hollow handle, a shaft journaled in the handle transversely thereof, a reel carried by the shaft and disposed exteriorly of the handle, a double ratchet bar movable within the handle, said bar comprising an elongated frame with oppositely extending teeth upon the inner longitudinal edges thereof, a ratchet wheel fixed upon the shaft and in engaging relation to the teeth of said ratchet bar, a grip slidable upon the handle, a cross-head within the handle and movable with the grip, and links extending between the ratchet bar and cross-head, said links having pivot connection with the cross-head and ratchet bar.

2. A fishing rod having a hollow handle, a shaft journaled in the handle transversely thereof, a reel carried by the shaft and disposed exteriorly of the handle, a ratchet wheel fixed upon the shaft and within the handle, a double ratchet bar movable within the handle and operatively positioned with relation to the ratchet wheel, a grip slidable upon the handle, a cross head within the handle and connected to the grip for movement therewith, and links connecting said cross head and double ratchet bar whereby the ratchet bar will engage the ratchet wheel for continuously rotating the same in one direction with the reciprocation of the grip.

JOHN D. BLAGDEN